May 2, 1961 P. L. DONOVAN 2,982,429
FARMING EQUIPMENT
Filed July 8, 1955 2 Sheets-Sheet 1
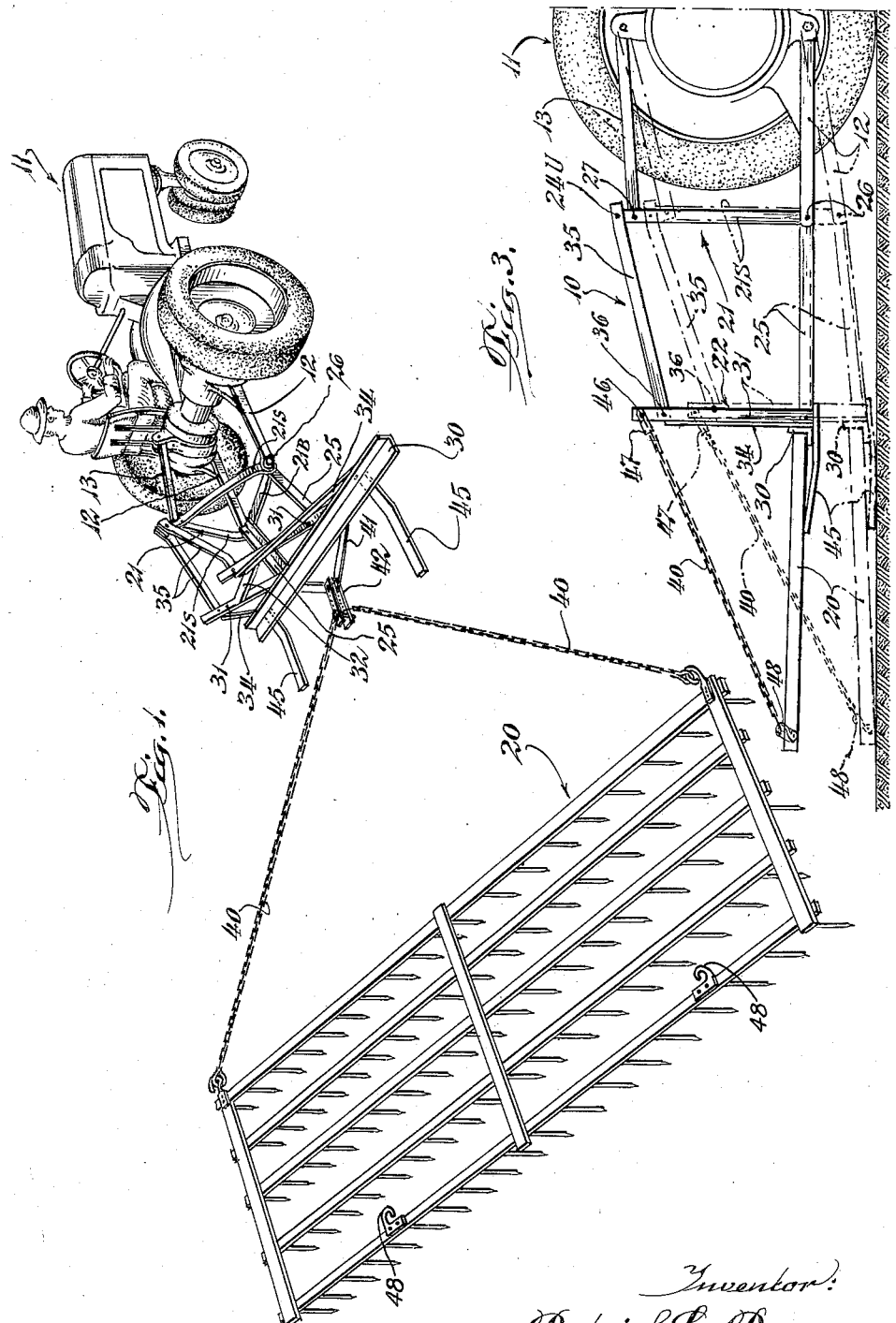
Inventor:
Patrick Leo Donovan
By Mann, Brown and Hansmann
Attorneys.

May 2, 1961 P. L. DONOVAN 2,982,429
FARMING EQUIPMENT
Filed July 8, 1955 2 Sheets-Sheet 2
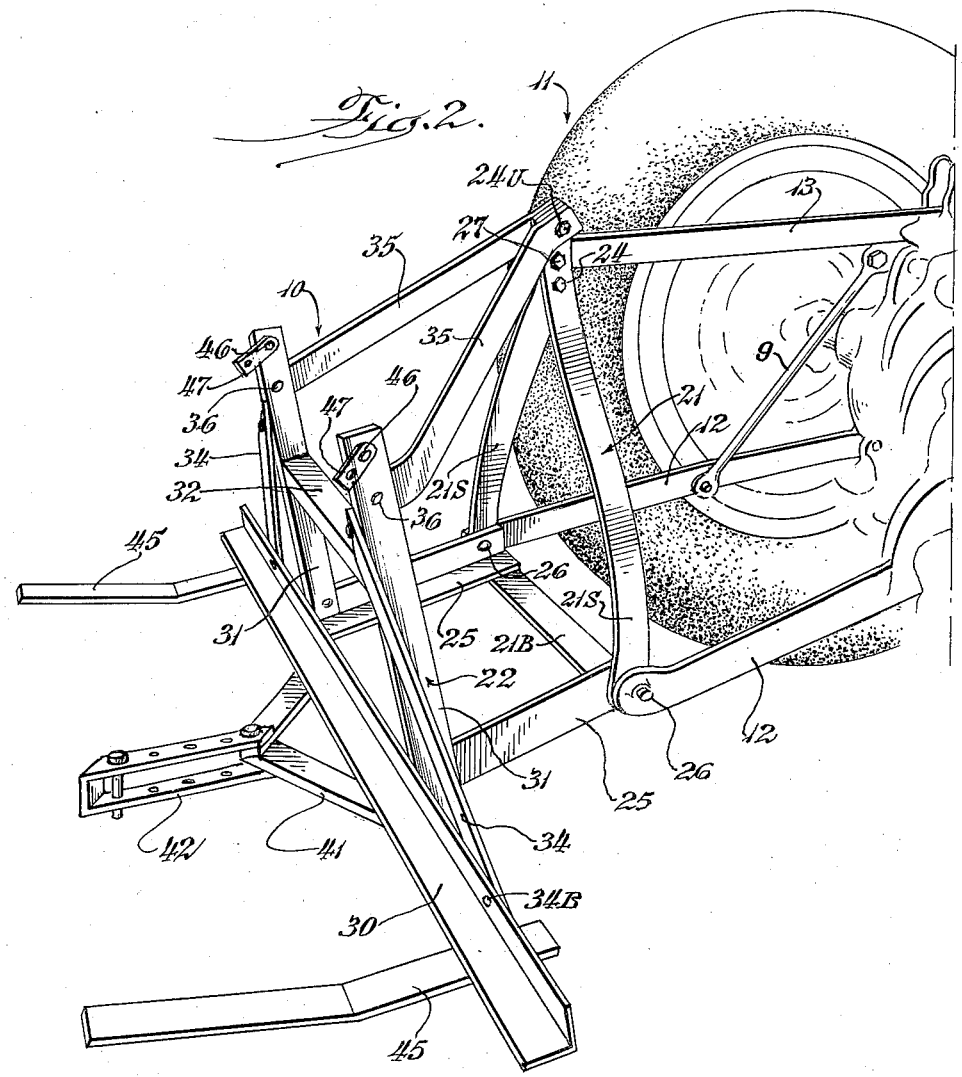
Inventor:
Patrick Leo Donovan
By Mann, Brown and Hansmann
Attorneys.

United States Patent Office 2,982,429
Patented May 2, 1961

2,982,429

FARMING EQUIPMENT

Patrick Leo Donovan, deceased, late of Peoria, Ill., by Mary J. Donovan, executrix, 216 N. Institute, Peoria, Ill.

Filed July 8, 1955, Ser. No. 520,653

6 Claims. (Cl. 214—140)

This invention relates to farming equipment and particularly to a tractor attachment for handling and operating drag type harrows.

Drag type harrows may of course take many different forms, as for example, the form illustrated in Patrick L. Donovan Patent No. 2,321,663, and such harrows are usually used in the field by attaching a plurality of harrow sections to an elongated draw bar which is connected by a plurality of drag chains to draft pivot means on a tractor so that the harrow assembly drags in a trailing relation behind the tractor. Such conventional mode of use is highly satisfactory insofar as the soil working action may be concerned, but it is recognized that the transporting, hitching and assembly of the harrow sections involves an unusual amount of burdensome manual labor with the resulting loss of productive working time.

In view of the foregoing it is the primary object of the invention to simplify the handling and transportation of drag type harrows, and related objects are to enable such harrows to be lifted and transported on the elevating mechanism of a tractor, and to enable this to be done with the minimum of manual lifting and handling of the harrow sections and drag chains.

Other and further objects of the present invention will be apparent from the following description and claims, and are illustrated in the accompanying drawings, which, by way of illustration, show a preferred embodiment, of the present invention and the principles thereof, and what is now considered to be the best mode in which it has been contemplated applying these principles. Other embodiments of the invention embodying the same or equivalent principles may be used and structural changes may be made as desired by those skilled in the art without departing from the invention.

In the drawings:

Fig. 1 is a rear perspective view of a tractor attachment embodying the features of the invention and showing a drag type harrow in its working position wherein it drags behind the tractor;

Fig. 2 is a enlarged rear perspective view of a modification of this attachment; and Fig. 3 is a side view illustrating the tractor lifting and carrying action as used with the tractor attachment of Fig. 1.

For purpose of disclosure the invention is herein illustrated as embodied in a tractor attachment 10 that is shown in its operative position on a tractor 11. Such tractors are usually provided with power operated elevating mechanism including two arms which at their upper ends are connected to the tractor power mechanism. These lifting arms are located at either side of the tractor differential. One such lifting arm is shown at 9 in Fig. 1 of the drawings hereof extending rearwardly and downwardly to a point where the lowermost end is pivotally secured to the left lower one of two frame members which transmit the lifting power to the harrow or other working element behind the tractor. A similar lifting arm, not shown, is located at the right side paralleling the diagonal arm 9 shown at Fig. 2. Lifting arms, as 9 in Fig. 2, are not illustrated in Figs. 1 and 3.

Means for transmitting the lifting power to the work include a pair of rearwardly projecting arms 12 that are spaced laterally from each other and whose forward ends are pivoted on a common horizontal axis fixed with respect to the tractor. These arms 12 cooperate with an upper guiding arm 13 that extends rearwardly from a horizontal pivot on the tractor. The arms 12 and 13 have connecting means such as horizontal pivot openings therein so that various atachments may be secured thereto for application of lifting and draft forces thereto through the arms 12 and 13.

Under and in accordance with this present invention the tractor attachment 10 is adapted for mounting on such conventional elevating means, and when so mounted is adapted to serve not only as a draft attachment for pulling a sectional drag type harrow 20 but is also adapted for lifting and transporting such harrow 20 to and from the field where it is used. Thus the attachment 10 comprises a rigid A-frame 21 that is adapted for association with the arms 12 and 13, and a rigid frame 22 spaced rearwardly from and rigidly connected to the A-frame 21 for operative association with the harrow 20 to either lift and transport such harrow or to drag the same in its usual working relation.

The A-frame 21 comprises a horizontal bottom bar 21B with a pair of side bars 21S joined to its opposite ends and extending upwardly and toward each other and connected together in spacial relation by a bolt 24 (Fig. 2) and a spacer at a point spaced downwardly from their upper ends. The lower ends of the side bars 21S are in the present instance connected to the bottom bar 21B by welding these bars to the vertical and horizontal flanges of a pair of connecting angles 25 that serve as part of the rigid connecting means between the frames 21 and 22. Aligned horizontal bores are formed through the lower ends of the side bars 21S and the vertical flanges of the angles 25 to provide for pivotal connection of the lift arms 12 to opposite lower sides of the A-frame 21 by pivot bolts or pins 26. At their upper ends the side bars 21S extend for a substantial distance above the connecting bolt 24, and at their uppermost ends are connected in spaced relation by a bolt 24U and a spacer. Intermediate the bolts 24 and 24U, the side bars 21S have aligned openings formed therein so that the rear end of the bar 13 may be disposed between the bars 21S and pivoted thereto by a pivot bolt or pin 27 adapted to pass through said openings.

The rear frame 22, as shown in Figs. 2 and 3, comprises an elongated horizontal bottom member 30 having a pair of columns 31 extended upwardly therefrom in rigid spaced relation, and these columns are connected near their upper ends by a cross bar 32. The members 30, 31 and 32 are preferably formed from angle bars, and are secured together by rivets or by welding, and the rear ends of the bars 25 are secured to the lower end portions of the columns 31. Angle brace bars 34 are extended downwardly and outwardly from the columns 31 to projecting end portions of the bottom member 30, and are anchored at their opposite ends by bolts 34B. Near their upper ends the columns 31 have bracing bars 35 connected thereto as by bolts 36, and the bars 35 extend forwardly in converging relation and are connected to the upper portion of the A-frame 21 by the bolt 24U. Thus the rear frame 22 is rigidly related to the A-frame 21, and may be raised and lowered in substantially a vertical relation by the elevating means of the tractor, and such raising and lowering of the frame 22 is utilized in enabling the attachment to accomplish its harrow-transporting and harrow-pulling functions.

Thus in respect to the harrow pulling function, means are provided at the midpoint of the bottom member 30 for attaching drag chains 40 that extend rearwardly in diverging relation for connection with the harrow 20 or the draw bar means that may be employed in the usual manner. As shown in Fig. 2, such attaching means are afforded by a pair of flat bars 41 disposed in an angular relation so as to extend rearwardly from the lower flange of the member 30 and join each other at a point spaced rearwardly of the member. The parts 30 and 41 may be welded to each other, and a vertical pivot hole is provided at the overlapped rear ends of the bars 41 to receive a conventional chain-connecting fitting 42 for the drag chains or equivalent connecting lines or cables 40. Thus when the harrow 20 has been attached to the anchoring bars 41, the frame 22 is raised a short distance from the ground, and the harrow assembly may be drawn over the field in its usual working operation.

As to the harrow lifting and transporting function, means are provided on the horizontal member 30 that may be inserted rearwardly under the forward edge of the harrow, and means are provided on the upper portions of the columns 31 from which the drag chains or the like may be extended rearwardly and downwardly to rear edge portions of the harrow to support the harrow in a substantially horizontal position on the attachment 10 when the attachment 10 is elevated or raised. The manner in which the lower side of the horizontal member 30 supports the forward edge of a harrow while it is being transported is illustrated in Fig. 3.

The attaching bars 41 as herein shown serve as a part of the harrow engaging and lifting means, and in addition, a pair of lifting bars 45 are extended rearwardly from beneath a rearwardly extending flange 30' of the member 30 and are attached in any suitable manner to the under side of the flange 30' with the forward ends of the bars 45 extending slightly beyond the member 30 as shown in Figure 2 and are attached to the member 30 between the ends thereof so that the ends of the horizontal member 30 project laterally beyond the bars 45, whereby to support the forward edge of a harrow. It will be observed that the upper surfaces of the horizontal member 30 and the lifting bars 45 are unobstructed and are clear for the reception of the forward edge of a harrow frame. Thus when the harrow 20 is to be transported, the drag members 40 are disconnected, and the attachment 10 is lowered substantially into contact with the ground. The tractor is then backed toward the front edge of the harrow so that the bars 45 and 41 move into position beneath the forward edge of the harrow and any drag bar that is being used. The operator then connects the members 40 to anchoring openings 46 in the upper ends of the columns 31 as by means of clevis devices 47, and extends the chains in rearward and downward relation and connects the same to the rear edge portions of the harrow as by clevis devices 48. The attachment 10 may then be elevated, and the harrow 20 is supported in horizontal rearwardly projecting relation thereon by the bars 41 and 45, and the cooperating chains 40 and columns 31. The harrow 20 may thus be quickly and easily transported to the next location in which it is to be used or stored. The attachment is then lowered so as to rest the harrow 20 on the ground, and after disconnecting the chains or other securing means 40, the tractor is driven forwardly so as to withdraw the bars 41 and 45 from beneath the harrow. The drag chains 40 may then be connected between the draw bar and the attaching draft fitting in the manner hereinbefore described, thus to enable further harrowing to be conducted.

When the attachment 10 is not in use, it may be removed from the lifting mechanism by removal of the pin 26 and the pin from the opening 27, and the attachment then rests in an upright position so that it may be easily attached to the tractor when it is to be used again.

From the foregoing description it will be apparent that the present invention materially simplifies the use of drag type harrows and enables such harrows to be lifted and transported with the minimum of manual effort.

Thus, while he has illustrated and described a specific embodiment of the invention, it will be recognized that this may be varied by those skilled in the art without departing from the spirit and scope of the invention.

What is claimed is:

1. In a tractor attachment for use in operating and readily transporting drag type harrows, a rigid frame structure having mounting means thereon for operatively mounting said frame structure on the conventional elevating means of a tractor, said frame structure having rigidly mounted thereon an elongated horizontal lower member adapted when said structure is operatively mounted on a tractor to be disposed parallel to the rear axle of the tractor, said member having rearwardly projecting arms thereon at spaced points extending from said horizontal lower member adapted to be inserted at substantially ground surface level under the forward edge of a harrow for supporting the harrow, the upper surfaces of said arms and said horizontal lower member being unobstructed for the reception of the forward edge of a harrow, and anchoring means on the upper part of said frame structure from which securing means may be extended rearwardly and downwardly to rear portions of such a harrow to cooperate with said arms in supporting a harrow raised from the ground with its forward edge in horizontal position when said frame structure is elevated.

2. In a tractor attachment for use in operating and readily transporting and handling drag type harrows, a rigid upright A-frame adapted for operation by the conventional elevating mechanism of a tractor and having upright legs constituting the sides of the A-frame, a first rigid base member extending between the lower ends of the legs of the A-frame, and lower members extending forwardly from the lower ends of the legs of said A-frame for pivotal attachment to a tractor, an upper brace member extending forwardly from the upper portion of said A-frame for pivotal attachment to the tractor, and lifting means extending from one of said lower members forwardly and upwardly for pivotal attachment to the lifting mechanism of a tractor, a second upright frame rearwardly of said A-frame, said rear frame having rigidly mounted thereon a horizontal lower member of substantial length and adapted to receive a harrow at approximately ground surface level and extending substantially parallel to a line passing between the lower end of the legs of the A-frame, and said rear frame having a pair of spaced column means extending upwardly from said horizontal lower member, means connected to the upper portion of said column means and the upper portion of said A-frame, and second lower members rigidly connected to the lower portion of said column means and the lower ends of said A-frame, said horizontal lower member of said rear frame having rearwardly projecting arms thereon at spaced points at ground surface level and adapted to be disposed in supporting relation beneath the front edge of a drag type harrow, and said arms being attached to and extending from said horizontal lower member and the upper surfaces of said arms and said horizontal lower member being unobstructed for the reception of the forward edge of a harrow.

3. In a tractor attachment for use in operating and readily transporting and handling drag type harrows, a rigid upright A-frame adapted for operation by the conventional elevating mechanism of a tractor and having upright legs constituting the sides of the A-frame, a first rigid base member extending between the lower ends of the legs of the A-frame, and lower members extending forwardly from the lower ends of the legs of said A-frame for pivotal attachment to a tractor, an upper brace member extending forwardly from the upper portion of said A-frame for pivotal attachment to the tractor, and lifting means extending from one of said lower members forwardly and upwardly for pivotal attachment to the elevating mechanism of a tractor, a second upright frame rearwardly of said A-frame, said rear frame having rigidly mounted thereon a horizontal lower member of substantial length and adapted to receive a harrow at approximately ground surface level and extending substantially parallel to a line passing between the lower ends of the legs of the A-frame, and said rear frame having a pair of spaced column means extending upwardly from said horizontal lower member, means connected to the upper portion of said column means and the upper portion of said A-frame, second lower members rigidly connected to the lower portion of said column means and the lower ends of said A-frame, and means adapted to extend from the upper portions of said column means to the rear portion of a harrow to hold its rear edge elevated while its forward edge is supported by said horizontal lower member of said rear frame, the upper surface of said horizontal lower member being unobstructed for the purpose of supporting the forward edge of a harrow.

4. In a tractor attachment for use in operating and readily transporting and handling drag type harrows, a rigid upright A-frame adapted for operation by the conventional elevating mechanism of a tractor and having upright legs constituting the sides of the A-frame, a first rigid base member extending between the lower ends of the legs of the A-frame, and lower members extending forwardly from the lower ends of the legs of said A-frame for pivotal attachment to a tractor, an upper brace member extending forwardly from the upper portion of said A-frame for pivotal attachment to the tractor, and lifting means extending from one of said lower members forwardly and upwardly for pivotal attachment to the elevating mechanism of a tractor, a second upright frame rearwardly of said A-frame, said rear frame having rigidly mounted thereon a horizontal lower member of substantial length and adapted to receive a harrow at approximately ground surface level and extending substantially parallel to a line passing between the lower ends of the legs of the A-frame, and said rear frame having a pair of spaced column means extending upwardly from said horizontal lower member, spacing bar means connected to the upper portion of said column means and the upper portion of said A-frame, and second lower members rigidly connected to the lower portion of said column means and pivotally to the lower ends of said A-frame, said horizontal lower member of said rear frame having rearwardly projecting arms thereon at spaced points adapted at ground surface level and to be disposed in supporting relation beneath the front edge of a drag type harrow, said horizontal lower member of said rear frame having a rearwardly extending flange extending lengthwise thereof and said rearwardly projecting arms extending substantially beyond the rear of said flange, and said arms being attached to and extending from said rearwardly extending flange of said horizontal lower member and the upper surfaces of said arms and said rearwardly extending flange being unobstructed for the reception of the forward edge of a harrow to be supported thereby.

5. In a tractor attachment for use in operating and readily transporting and handling drag type harrows, a rigid upright A-frame adapted for operation by the conventional elevating mechanism of a tractor and having upright legs constituting the sides of the A-frame, a first rigid base member extending between the lower ends of the legs of the A-frame, and lower members extending forwardly from the lower ends of the legs of said A-frame for pivotal attachment to a tractor, an upper brace member extending forwardly from the upper portion of said A-frame for pivotal attachment to the tractor, and lifting means extending from one of said lower members forwardly and upwardly for pivotal attachment to the elevating mechanism of a tractor, a second upright frame rearwardly of said A-frame, said rear frame having rigidly mounted thereon a horizontal lower member of substantial length and adapted to receive a harrow at approximately ground surface level and extending substantially parallel to a line passing between the lower ends of the legs of the A-frame, and said rear frame having a pair of spaced column means extending upwardly from said horizontal lower member, means connected to the upper portion of said column means and the upper portion of said A-frame, and second lower members rigidly connected to the lower portion of said column means and pivotally to the lower ends of said A-frame, said horizontal lower member of said rear frame having rearwardly projecting arms thereon at spaced points at ground surface level and adapted to be disposed in supporting relation beneath the front edge of a drag type harrow, said horizontal lower member of said rear frame having a rearwardly extending flange extending lengthwise the full length thereof and from the lower edge of said horizontal lower member, and said rearwardly projecting arms extending a substantial distance beyond the rear of said flange, and said arms being attached to and extending from said rearwardly extending flange of said horizontal lower member and the upper surfaces of said arms and said rearwardly extending flange being unobstructed for the reception of a harrow, and said horizontal lower member extending laterally beyond said arms for the purpose of supporting the forward edge of a harrow frame.

6. In a tractor attachment for use in operating and readily transporting and handling drag type harrows, a first rigid upright frame adapted for operation by the conventional elevating mechanism of a tractor, and having upright legs constituting the sides of the A-frame, a first rigid brace member extending between the lower ends of the legs of said first rigid upright frame, and lower members extending forwardly from the lower ends of the legs of said first rigid upright frame for pivotal attachment to a tractor, an upper brace member extending forwardly from the upper portion of said first rigid upright frame for pivotal attachment to the tractor, and lifting means extending from one of said lower members forwardly and upwardly for pivotal attachment to the elevating mechanism of a tractor, a second upright frame rearwardly of said first rigid upright frame, said second frame having a horizontal lower member of substantial length and adapted to receive a harrow at approximately ground surface level and extending substantially parallel to a line passing between the lower ends of the legs of said first rigid upright frame, and said second frame having a pair of spaced column means extending upwardly from said horizontal lower member, spacing frame means connected to the upper portion of said column means and the upper portion of said first rigid upright frame, second lower members rigidly connected to the lower portion of said column means and pivotally connected to the lower ends of said first rigid upright frame, the upper surface of said horizontal lower member being unobstructed for the reception of the forward edge of a harrow frame to be supported on said horizontal lower member.

References Cited in the file of this patent
UNITED STATES PATENTS

| | | |
|---|---|---|
| 2,427,575 | Sedore | Sept. 16, 1947 |
| 2,505,639 | Eaton | Apr. 25, 1950 |
| 2,531,768 | Cline et al. | Nov. 28, 1950 |
| 2,562,486 | Denning | July 31, 1951 |
| 2,670,089 | Paterson | Feb. 23, 1954 |
| 2,730,250 | Harrison | Jan. 10, 1956 |
| 2,785,615 | McCall et al. | Mar. 19, 1957 |
| 2,881,845 | Aitkenhead | Apr. 14, 1959 |